United States Patent [19]

Stewart et al.

[11] Patent Number: 4,743,383

[45] Date of Patent: May 10, 1988

[54] DRILLING FLUID ADDITIVES FOR USE IN HARD BRINE ENVIRONMENTS

[75] Inventors: Wayne S. Stewart, Coffeyville, Kans.; George G. Dixon, Bartlesville, Okla.; John M. Elsen, Tulsa, Okla.; Billy L. Swanson, Delaware, Okla.

[73] Assignee: Phillips Petroleum Company, Bartlesville, Okla.

[21] Appl. No.: 934,388

[22] Filed: Nov. 24, 1986

[51] Int. Cl.[4] .............................. C09K 7/02
[52] U.S. Cl. .................. 252/8.51; 252/8.511; 252/8.514
[58] Field of Search ............... 252/8.51, 8.511, 8.514

[56] References Cited

U.S. PATENT DOCUMENTS

| 2,578,888 | 12/1951 | Kaveler | 252/8.5 |
| 2,862,881 | 12/1958 | Reddie | 252/8.5 |
| 2,885,358 | 5/1959 | Reddie | 252/8.5 |
| 3,028,333 | 4/1962 | Stratton | 252/8.51 |
| 3,062,740 | 11/1962 | Reddie et al. | 252/8.5 |
| 3,072,569 | 1/1963 | Siegele | 252/8.5 |
| 3,127,343 | 3/1964 | Reddie et al. | 252/8.5 |
| 3,899,431 | 8/1975 | Hayes et al. | 252/8.5 |
| 3,948,782 | 4/1976 | Dreher et al. | 252/8.51 X |
| 4,425,241 | 1/1984 | Swanson | 252/8.5 A |
| 4,427,556 | 1/1984 | House et al. | 252/363.5 X |
| 4,502,965 | 3/1985 | Giddings et al. | 252/8.51 |
| 4,505,828 | 3/1985 | Lipowski et al. | 252/8.55 |
| 4,626,362 | 12/1986 | Dickert et al. | 252/8.51 |

FOREIGN PATENT DOCUMENTS 2152552 8/1985 United Kingdom .

*Primary Examiner*—Herbert B. Guynn
*Attorney, Agent, or Firm*—J. E. Phillips

[57] ABSTRACT

A drilling fluid additive is disclosed which will prevent water loss into subterranean formations during the drilling of oil and gas wells in hard brine environments. The drilling fluid additive comprises a hydrocarbon, an anionic surfactant, an alcohol, a sulfonated asphalt, a biopolymer, and optionally an organophilic clay, poly(N-vinyl-2-pyrrolidone-co-sodium-2-acryamido-2-methylpropane sulfonate, and water.

17 Claims, No Drawings

DRILLING FLUID ADDITIVES FOR USE IN HARD BRINE ENVIRONMENTS

This invention relates to drilling fluid additives which will improve the water loss properties of water and clay based drilling fluids, calcium treated fluids, potassium treated fluids and invert emulsion fluids that are being utilized in hard brine environments. Another aspect of this invention relates to a method for improving the water loss properties of drilling fluids that are being utilized in a hard brine environment. Another aspect of this invention relates to a drilling fluid having enhanced water loss properties in hard brine environments. A still further aspect of this invention relates to an improved process for the production of oil and gas in hard brine environments.

Drilling fluids serve a number of functions. They cool the bit, bring the cuttings to the surface, and keep the oil, gas, and water confined to their respective formations during the drilling process. In addition, a highly important property of a drilling fluid is the ability to form an impervious layer upon the permeable walls of the borehole, which inhibits the ingress of water from the drilling fluid into the formation. Excessive water loss from the drilling fluids can cause severe problems. For example, filter cake buildup can become so thick that the drillpipe may become stuck; also, there may be great difficulty in withdrawing the pipe from the hole. Further, high water losses can cause sloughing and caving in of the shale formations.

It has been discovered that typical water and clay based drilling fluids do not adequately perform these functions in hard brine environments. They do not prevent the ingress of water from the drilling fluid into the formation, which often lead to the problems described earlier.

In an attempt to solve this problem, various drilling additives that were heretofor known for their ability to control fluid loss have been tried. However, none of these additives performed adequately in a hard brine environment.

For example, U.S. Pat. No. 3,899,431 discloses an emulsified drilling additive containing water, oil, an electrolyte and a sodium petroleum sulfonate that is known for its ability to prevent fluid loss from drilling fluids. When it is introduced into a hard brine, the numerous divalent cations present cause the emulsion to crack and thereby decrease its ability to control water loss into the formation.

Therefore, it would be a valuable contribution to the art to provide a drilling fluid additive system which would improve the fluid loss characteristics of drilling fluids when utilized in hard brine environments.

It is thus an object of the present invention to provide a drilling fluid additive which will prevent fluid loss into subterranean formations during the drilling of oil and gas wells in hard brine environments. It is a further object of the present invention to provide a method for improving the fluid loss properties of drilling fluids being utilized in hard brine environments. It is another object of the present invention to provide a drilling fluid having enhanced water loss properties in hard brine environments. A still further object of this invention is to provide an improved process for the recovery of oil and gas from hard brine environments.

Other aspects, objects, and several advantages of this invention will become apparent to one skilled in the art upon consideration of the accompanying disclosure and appended claims.

In accordance with the present invention, it has been discovered that a drilling fluid additive system which imparts superior water loss properties in hard brine environments to a drilling fluid is provided by combining (A) an anionic surfactant, (B) an alcohol, (C) a sulfonated asphalt, (D) a biopolymer, and (E) a liquid hydrocarbon.

The anionic surfactant (A) is at least one selected from the group consisting of petroleum sulfonates, alcohol sulfates, and ethoxylated alcohol sulfates.

Petroleum sulfonates which are suitable anionic surfactants in the present invention are those selected from the group consisting of potassium petroleum sulfonates, sodium petroleum sulfonates, or lithium petroleum sulfonates. These petroleum sulfonates should have an average equivalent weight within the range of 300 to 525, and more preferably within the range of 415 to 430. The sulfonate can be a monosulfonate or a polysulfonated molecule. It is also preferred that the petroleum sulfonate be at least 50% active sulfonate and more preferably 61–63% active sulfonate.

Alcohol sulfates which can be utilized as anionic surfactants in the present invention can be represented by the formula,

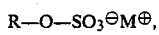

$$R-O-SO_3^{\ominus}M^{\oplus},$$

wherein R is an alkyl group having from 8 to 16 carbon atoms and M is selected from the group consisting of sodium, potassium, or lithium. Representative examples are those selected from the group consisting of potassium octyl sulfate, sodium octyl sulfate, lithium octyl sulfate, potassium nonyl sulfate, sodium nonyl sulfate, lithium nonyl sulfate, potassium decyl sulfate, sodium decyl sulfate, lithium decyl sulfate, potassium undecyl sulfate, sodium undecyl sulfate, lithium undecyl sulfate, sodium dodecyl sulfate, potassium dodecyl sulfate, lithium dodecyl sulfate, potassium tridecyl sulfate, sodium tridecyl sulfate, lithium tridecyl sulfate, potassium tetradecyl sulfate, sodium tetradecyl sulfate, lithium tetradecyl sulfate, potassium pentadecyl sulfate, sodium pentadecyl sulfate, lithium pentadecyl sulfate, potassium hexadecyl sulfate, sodium hexadecyl sulfate and lithium hexadecyl sulfate.

Ethoxylated alcohol sulfates which are suitable for use as an anionic surfactant in the present invention can be represented by the formula,

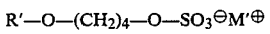

$$R'-O-(CH_2)_4-O-SO_3^{\ominus}M'^{\oplus}$$

wherein R' is an alkyl group containing from 8 to 16 carbon atoms and M' is lithium, sodium or potassium.

Representative examples can be selected from the group consisting of sodium 8-octoxybutyl sulfate, potassium 8-octoxybutyl sulfate, lithium 8-octoxybutyl sulfate, sodium 9-nonoxybutyl sulfate, lithium 9-nonoxybutyl sulfate, potassium 9-nonoxybutyl sulfate, sodium 10-decoxybutyl sulfate, lithium 10-decoxybutyl sulfate, potassium 10-decoxybutyl sulfate, sodium 11-undecoxybutyl sulfate, lithium 11-undecoxybutyl sulfate, potassium 11-undecoxybutyl sulfate, sodium 12-dodecoxybutyl sulfate, lithium 12-dodecoxybutyl sulfate, potassium 12-dodecoxybutyl sulfate, sodium 13-tridecoxybutyl sulfate, lithium 13-tridecoxybutyl sulfate, potassium 13-tridecoxybutyl sulfate, sodium 14-tetradecoxybutyl sulfate, lithium 14-tetradecoxybutyl sulfate, potassium 14-tetradecoxybutyl sulfate, sodium 15-pentadecoxybutyl sulfate, lithium 15-pentadecoxybutyl sulfate, potassium 15-pentadecoxybutyl sulfate, sodium 16 hexadecoxybutyl sulfate, lithium 16 hexadecoxybutyl sulfate, potassium 16 hexadecoxybutyl sulfate.

Component B of the drilling fluid additive is an alcohol which can be represented by one of the following formulas, $$R''—O—R'—CH_2—OH$$

wherein R is an alkyl group having from 2 to 5 carbon atoms, R' is an alkylene group having from 1 to 4 carbon atoms and R'' is an alkyl group having from 2 to 5 carbon atoms. Representative examples are those selected from the group consisting of ethanol, propanol, n-butanol, isobutanol, n-pentanol, isopentanol, 2-ethoxyethanol, 2-propoxyethanol, 2-butoxyethanol, 2-pentoxyethanol, 3-ethoxypropanol, 3-propoxypropanol, 3-butoxypropanol, 3-pentoxypropanol, 4-ethoxybutanol, 4-propoxybutanol, 4-butoxybutanol, 4-pentoxybutanol, 5-ethoxypentanol, 5-propoxypentanol, 5-butoxypentanol, and 5-pentoxypentanol.

Component C is a sulfonated asphalt. The term "sulfonated asphalt" as used in this specification and in the appended claims is employed herein to mean the ammonium, alkali metal, and alkaline earth metal salts of asphalt that have been sulfonated with a sulfonating agent such as liquid sulfur trioxide, and neutralized with an agent selected from the group consisting of ammonia, alkali metal oxides, or hydroxides, and alkaline earth metal oxides or hydroxides. The term "asphalt" as employed herein refers to the dark brown to black semi-solid or solid cementitious hydrocarbon material, of which bitumens are the sole or predominant constituent, which is completely or substantially soluble in carbon disulfide. Presently, the preferred sulfonated asphalt is at least 70% soluble in 100° C. water and is available under the tradename Soltex ® which is available from Drilling Specialties Company.

The biopolymers (D) are those produced by a process comprising the microbial transformation of a carbohydrate with a microorganism to obtain a polymeric material which differs from the parent polymeric material in respect of composition, properties and structure. Suitable carbohydrates include sugars, such as pentoses or hexoses, glucose, sucrose, fructose, maltose, lactose, galactose, and starches, for example soluble starch, corn starch, and the like. Crude products having a high carbohydrate concentration can also be used, such as raw sugar or crude molasses.

Microorganisms suitable for effecting the microbial transformation of the carbohydrates are plant pathogens. Typical of such microorganisms are species of the genus Xanthomonas. Thus, for example, a heteropolysaccharide biopolymer may be prepared from glucose by the action of *Xanthomonas campestris* (XC polymer). Other species of Xanthomonas bacteria which are useful in preparing the biopolymers of the present invention include *Xanthomonas phaseoli, Xanthomonas mulvacearn, Xanthomonas carotae, Xanthomonas translucens, Xanthomonas hederae* and *Xanthomonas papavericoli*. Other organisms which are useful for the production of biopolymers include *Hansenula holstii, Arthrobacter viscous, Methylmonas mucosa, Erwinia tahitica,* and *Azotobacter indicus*.

Examples of suitable biopolypolymers are those produced by the action of at least one of the following microorganisms; *Xanthomonas campestris, Xanthomonas phaseoli, Xanthomonas mulvacearn, Xanthomonas carotae, Xanthomonas translucens, Xanthomonas hederae, Xanthomonas papavericoli, Hansenula holstii, Arthrobacter viscous, Methylomonas mucosa, Erwinia tahitica* and *Azotobacter indicus*.

Component E is a hydrocarbon which is a liquid at room temperature and standard atmospheric pressure. Suitable liquid hydrocarbons are those selected from the group consisting of crude oil, kerosene, naphthas, heavy naphthas, straight run gasoline, diesel fuel, jet fuel, benzene, xylene, toluene and isoparaffinic oil. At the present time, the preferred liquid hydrocarbon is an isoparaffinic oil having a boiling point within the range of 450°–550° F. and is comprised of $C_{13}$—$C_{17}$ hydrocarbon chains.

Although not required, it is presently preferred that the drilling fluid additive system also contain (F), an organophilic clay. As used in this application, the term organophilic clay is intended to include those clays in which the inorganic cations associated with the clay have been displaced by organic cations such as a quaternary ammonium cation. Suitable organophilic clays are bentonite clays or attapulgite clays that have been treated with a quaternary amine. These clays can be represented by the formula $$[R_2N(CH_3)_2]^\oplus clay^\ominus,$$

wherein R is an alkyl group containing between 8 to 16 carbon atoms. Representative examples are those selected from the group consisting of dioctyldimethylammonium bentonite, dinonyldimethylammonium bentonite, didecyldimethylammonium bentonite, diundecyldimethylammonium bentonite, didodecyldimethylammonium bentonite, ditridecyldimethylammonium bentonite, ditetradecyldimethylammonium bentonite, dipentadecyldimethylammonium bentonite, dihexadecyldimethylammonium bentonite.

It is also preferred that the drilling fluid additive contain (G) a copolymer of N-vinyl-2-pyrrolidone (VP) and sodium 2-acrylamido-2-methylpropane sulfonate (sodium AMPS). The ratio of the N-vinyl-2-pyrrolidone to sodium 2-acrylamide-2-methylpropane sulfonate should be within the range of 1 part VP per 99 parts sodium AMPS to 50 parts VP per 50 parts sodium AMPS. More preferably the ratio is 5 parts VP per 95 parts sodium AMPS to 15 parts VP per 85 parts sodium AMPS.

Finally, it is also preferred that the drilling fluid additive contain (H) water.

The various constituents of the drilling fluid additive should be present within the following ranges:

| COMPONENT | BROAD RANGE (weight percent) | PREFERRED RANGE (weight percent) |
|---|---|---|
| (A) Anionic Surfactant | 2–20 | 5–15 |
| (B) Alcohol | 2–20 | 3–10 |
| (C) Sulfonated Asphalt | 1–25 | 5–15 |
| (D) Biopolymer | 1–15 | 3–10 |
| (E) Hydrocarbon | 30–70 | 40–60 |
| (F) Organophilic Clay | 0–10 | 2–5 |
| (G) Copolymer of VP/NaAMPS | 0–25 | 3–10 |
| (H) Water | 0–25 | 5–15 |

The type of drilling fluid to which the additive system of the present invention is added is not critical.

Thus, examples of suitable drilling fluids are clay fluids, calcium treated fluids, potassium treated fluids, and invert oil-emulsion fluids.

Generally, the drilling additive of the present invention should be added in such a quantity that the concentration of the present invention within the drilling fluid should be within the range of 10 to 30 lb/bbl.

As stated earlier, the drilling fluid additive of the present invention is useful to prevent the loss of water, into the subterranean formations of oil and gas wells, especially ones being drilled in a hard brine environment. By hard brine, we mean any aqueous solution of mineral salts having greater than 10,000 ppm of dissolved electrolytes and containing divalent cations such as are frequently present in oil fields. Oil field brines commonly contain varying amounts of sodium chloride, calcium chloride, or magnesium salts.

The following specific examples are intended to illustrate the advantages of this invention, but are not intended to unduly limit this invention.

EXAMPLE I

The purpose of this example is to demonstrate the composition of and a method for preparing the preferred drilling fluid additive system of the present invention.

The composition of the preferred drilling fluid additive system of the present invention can be represented by the formula below.

| Composition I | |
|---|---|
| Material | Weight (grams) |
| isoparaffinic oil[1] | 50 |
| sodium petroleum sulfonate[2] | 10 |
| 2-butoxyethanol | 5 |
| organophilic clay[3] | 3 |
| biopolymer[4] | 5 |
| copolymer[5] | 5 |
| sulfonated asphalt[6] | 10 |
| water | 10 |

[1]Soltrol 220 ® oil (an isoparaffinic oil having a boiling point within the range of 450–550° F. which is currently available from Phillips Petroleum Company).
[2]Petronate L ® additive (a sodium petroleum sulfonate having an average equivalent weight within the range of 415–430 which is currently available from WITCO).
[3]Geltone II ® clay, a bentonite clay that has been treated with a quaternary amine which is currently available from N. L. Baroid.
[4]XC Polymer ®, a biopolymer produced by the action of Xanthomonas campestris available from Pfizer.
[5]poly(N—vinyl-2-pyrrolidone-co-sodium 2-acrylamido-2-methylpropane sulfonate) (10 parts VP per 90 parts Na sulfonate)
[6]Soltex ® additive, a sulfonated asphalt which is currently available from Phillips Petroleum Company.

A preferred manner of preparing this drilling fluid additive system is to mix the ingredients in the order listed under agitation.

EXAMPLE II

The purpose of this example is to show the composition and a manner of preparing another albeit less preferred drilling fluid additive system in accordance with the present invention.

The composition of this drilling fluid additive system can be represented by the formula below.

| Composition II | |
|---|---|
| Material[1] | Weight (grams) |
| isoparaffinic oil | 50 |
| sodium petroleum sulfonate | 10 |
| 2-butoxyethanol | 5 |
| organophilic clay | 3 |
| biopolymer | 5 |
| sulfonated asphalt | 10 |
| water | 10 |

[1]All of the ingredients are identical to their counterparts in Example I.

This drilling fluid additive system is formed by mixing the ingredients in the order listed under agitation.

EXAMPLE III

The purpose of this example is to demonstrate that the drilling fluid additive systems of Examples I and II improve the water loss properties of a drilling fluid being utilized in hard brine environments.

In order to demonstrate this, the drilling fluid additive systems of Examples I and II were dispersed in conventional clay based drilling fluids and their ability to improve the water loss properties of those drilling fluids was tested in a simulated hard brine environment.[1]

For comparative purposes, other drilling additives were added to identical clay based fluids and tested in an identical manner in a simulated hard brine environment. The other drilling additives tested were:
(A) a biopolymer produced by the action of Xanthomonas campestris,
(B) a copolymer of N-vinyl-2-pyrrolidone (VP) and sodium-2-acrylamido-2-methylpropane sulfonate (NaAMPS), with the ratio of VP:AMPS being 1:9.
(C) a composition having the following formula[2]

| Material | Weight (grams) |
|---|---|
| isoparaffinic oil | 50 |
| sodium petroleum sulfonate | 10 |
| 2-butoxyethanol | 5 |
| organophilic clay | 3 |
| sulfonated asphalt | 10 |
| water | 10 |

The viscosity (PV), yield point (YP), and gel strength (Gels) of the drilling fluids were determined as indicated on pages 6–8 of the American Petroleum's Institute Recommended Practice, RP 13-B, May 1985. The water loss properties (WL) of the fluids were measured as indicated on pages 9–12 of the same volume for low temperature/low pressure testing.

The following results were obtained.

| | Initial Properties | | |
|---|---|---|---|
| Drilling Additive[3] | PV/YP | Gels | WL |
| no drilling additive | 3/0 | 0/1 | 115 |
| A | 10/8 | 5/7 | 14.7 |
| B | 5/0 | 1/1 | 16 |
| C | 3/2 | *—/0 | 58 |
| Composition I of Example I | 12/17 | 8/10 | 2.8 |
| Composition II of Example II | 10/10 | 5/—* | 5.4 |

*These samples were inadvertently not analyzed.

A comparison of the performance of Composition I and Composition II with the other drilling additives shows that the present invention markedly improves the water loss characteristics of drilling fluids which are being utilized in a hard brine environment. Composition I lowered the water loss of the clay fluid from 115 to 2.8, whereas Composition II lowered the water loss to 5.4. The other drilling additives did not reduce the water loss to an acceptable level.

[1] A simulated hard brine environment was obtained by adding 1,235 grams of NaCl, 308 grams of CaCl$_2$, and 78.5 grams of MgCl$_2$·6H$_2$O to 5000 ml of water.
[2] All components are identical to their counterparts in Examples I and II.
[3] Drilling fluids were prepared having a concentration of 10 lbs/bbl of bentonite clay and 15 lbs/bbl of illite clay. Drilling additives were added in the following quantities:
A. 1 lb/bbl of biopolymer;
B. 1 lb/bbl of copolymer;
C. 20 lbs/bbl;
Composition I 20 lbs/bbl total with 1 lb/bbl each of biopolymer and copolymer contained therein.
Composition II 20 lbs/bbl total with 1 lb/bbl of biopolymer contained therein.

Reasonable variations and modifications can be made in view of the foregoing disclosure without departing from the spirit and scope of the invention.

That which is claimed is:

1. A drilling fluid additive comprising:
   (a) from 30–70 weight percent of a liquid hydrocarbon;
   (b) from 2–20 weight percent of an anionic surfactant, wherein said anionic surfactant is selected from the group consisting of petroleum sulfonates, alcohol sulfates, and ethoxylated alcohol sulfates;
   (c) from 2–20 weight percent of an alcohol, wherein said alcohol is represented by one of the following formulas;

$$R-OH \text{ or } \begin{array}{c} R_1-CH_2 \\ | \quad | \\ O \quad OH \\ | \\ R_2 \end{array}$$

wherein R is an alkyl group containing from 2 to 5 carbon atoms; R$_1$ is an alkylene group containing from 1 to 4 carbon atoms and R$_2$ is an alkyl group containing from 2 to 5 carbon atoms;
   (d) from 1–25 weight percent of a sulfonated asphalt, and;
   (e) from 1–15 weight percent of a biopolymer wherein said biopolymer is produced by the action of at least one microorganism selected from the group consisting of *Xanthomonas campestris, Xanthomonas phaseoli, Xanthomonas mulvacearn, Xanthomonas carotae, Xanthomonas translucens, Xanthomonas hederae, Xanthomonas papavericoli, Hansenula holstii, Arthrobacter viscous, Methylomonas mucosa, Erwinia tahitica* and *Azobacter indicus.*

2. The drilling fluid additive of claim 1 wherein said liquid hydrocarbon is selected from the group consisting of crude oil, kerosene, naphthas, heavy naphthas, straight run gasoline, diesel fuel, jet fuel, benzene, xylene, toluene, and isoparaffinic oil.

3. The drilling fluid additive of claim 1 wherein said petroleum sulfonate is selected from the group consisting of sodium petroleum sulfonate, lithium petroleum sulfonate, and potassium petroleum sulfonate.

4. The drilling fluid additive of claim 1 wherein said alcohol sulfate can be represented by the formula $$R-O-SO_3^{\ominus}M^{\oplus};$$

wherein R is an alkyl group containing from 8 to 16 carbon atoms and M is selected from the group consisting of sodium, potassium, or lithium.

5. The drilling fluid additive of claim 1 wherein said ethoxylated alcohol sulfates can be represented by the formula;

$$R-O-(CH_2)_4-OSO_3^{\ominus} M^{\oplus};$$

wherein R is an alkyl group containing from 8 to 16 carbon atoms and M is selected from the group consisting of sodium, potassium, and lithium.

6. A drilling fluid additive in accordance with claim 1 having additionally present therein from 0.1 to 10 weight percent of an organophilic clay.

7. A drilling fluid additive in accordance with claim 6 wherein said organophilic clay can be represented by the formula $$[R_2N(CH_3)_2]^{\oplus}Clay^{\ominus}$$

wherein R$_2$ is an alkyl group containing from 8–16 carbon atoms.

8. A drilling fluid additive in accordance with claim 7 wherein said clay is either a bentonite clay or an attapulgite clay.

9. A drilling fluid additive in accordance with claim 1 having additionally present therein from 1 to 25 weight percent of a copolymer of N-vinyl-2-pyrrolidone and sodium 2-acrylamido-2-methylpropane sulfonate with the ratio of moles N-vinyl-2-pyrrolidone to sodium 2-acrylamido-2-methylpropane sulfonate being in the range of 1:99 to 50:50.

10. A drilling fluid additive in accordance with claim 1 having additionally therein from 1 to 30 weight percent of water.

11. A drilling fluid additive in accordance with claim 1 having additionally therein;
   (a) from 0.1 to 10 weight percent of an organophilic clay;
   (b) from 1 to 25 weight percent of a copolymer of N-vinyl-2-pyrrolidone and sodium 2-acrylamido 2-methylpropane sulfonate with the ratio of moles of N-vinyl-2-pyrrolidone to sodium 2-acrylamido-2-methylpropane sulfonate being in the range of from 1:99 to 50:50; and
   (c) from 1 to 30 weight percent of water.

12. The drilling fluid additive of claim 1 wherein
   (a) said hydrocarbon is an isoparaffinic oil having a boiling point within the range of from 450°–550° F. and is comprised of C$_{13}$–C$_{17}$ hydrocarbon chains;
   (b) said anionic surfactant is a sodium petroleum sulfonate having an equivalent weight within the range of 415–430 and is 61–63% active sulfonate;
   (c) said alcohol is 2-butoxyethanol;
   (d) said organophilic clay is a bentonite clay that has been treated with a quaternary amine;
   (e) said biopolymer is a polysaccharide produced by the action of *Xanthamonas campestris;* and
   (f) said copolymer is 10 parts N-vinyl-2-pyrrolidone per 90 parts sodium-2-acrylamido-2-methylpropane sulfonate.

13. The drilling fluid additive of claim 12 wherein;
   (a) said liquid hydrocarbon is present in the quantity of about 50 weight percent;
   (b) said anionic surfactant is present in the quantity of about 10 weight percent;
   (c) said alcohol is present in the quantity of about 5 weight percent;
   (d) said organophilic clay is present in the quantity of about 3 weight percent;

(e) said biopolymer is present in the quantity of about 5 weight percent;
(f) said copolymer is present in the quantity of about 5 weight percent;
(g) said sulfonated asphalt is present in the quantity of about 10 weight percent; and
(h) said water is present in the quantity of about 10 weight percent.

14. An improved drilling fluid possessing enhanced water loss properties in hard brine environments, said brine having greater than 10,000 ppm dissolved electrolytes and containing divalent cations, which comprises a drilling fluid which otherwise exhibits high water loss properties in hard brine and the drilling fluid additive of claim 1.

15. An improved drilling fluid possessing enhanced water loss properties in hard brine environments, said hard brine having greater than 10,000 ppm of dissolved electrolytes and containing divalent cations, which comprises a drilling fluid which otherwise exhibits high water loss properties in hard brine and the drilling fluid additive of claim 13.

16. In a process for drilling a well to recover oil and gas from a subterranean formation in a hard brine environment, said brine having greater than 10,000 ppm dissolved electrolytes and containing divalent cations, wherein there is circulated in the well while drilling a drilling fluid which exhibits water loss in said hard brine environment, the improvement which comprises introducing 10 to 30 lb/bbl of the composition of claim 1 into said drilling fluid.

17. In a process for drilling a well to recover oil and gas from a subterranean formation in a hard brine environment, said hard brine having greater than 10,000 ppm of dissolved electrolytes and containing divalent cations, wherein there is circulated in the well while drilling a drilling fluid which exhibits water loss in said hard brine environment, the improvement which comprises introducing 10 to 30 lb/bbl of the composition of claim 12 into said drilling fluid.

* * * * *